United States Patent [19]
Reuter

[11] Patent Number: 6,112,789
[45] Date of Patent: Sep. 5, 2000

[54] PNEUMATIC TIRES MADE WITH TEXTILE CARDS COMPRISING TWO PORTIONS, THE FILAMENTS IN THE SECOND RADIALLY INNER PORTION BEING COMPACTED OR FUSED

[75] Inventor: René François Reuter, Burden, Luxembourg

[73] Assignee: The Goodyear Tire & Rubber Company, Akron, Ohio

[21] Appl. No.: 08/837,449

[22] Filed: Apr. 18, 1997

[51] Int. Cl.⁷ .............................. B60C 9/00; B60C 9/04; B60C 9/20; D02G 3/48
[52] U.S. Cl. ..................... 152/451; 57/902; 152/527; 152/556
[58] Field of Search ............................. 57/210, 211, 224, 57/232, 234, 236, 242, 243, 250, 251, 902; 152/451, 527, 556; 428/392, 393, 394, 395, 370, 397, 373

[56] References Cited

FOREIGN PATENT DOCUMENTS

| 0 396 494 A2 | 11/1990 | European Pat. Off. . |
| 0 624 667 A2 | 11/1994 | European Pat. Off. . |
| 1 109 816A | 4/1968 | United Kingdom . |
| 1 205 281 | 9/1970 | United Kingdom . |

*Primary Examiner*—Adrienne C. Johnstone
*Attorney, Agent, or Firm*—David E Wheeler

[57] ABSTRACT

Special cords of textile material are used for reinforcing a portion of a pneumatic tire. The cord comprises at least one yarn and has a first portion adjacent to its outer peripheral surface and a second radially inner portion, adjacent to its core, wherein the second portion is constituted by filaments which are compacted and possibly fused together and the first portion by discrete filaments. Further a method for making such cord and a pneumatic tire including such cord are disclosed.

3 Claims, 7 Drawing Sheets

PNEUMATIC TIRES MADE WITH TEXTILE CARDS COMPRISING TWO PORTIONS, THE FILAMENTS IN THE SECOND RADIALLY INNER PORTION BEING COMPACTED OR FUSED

BACKGROUND OF THE INVENTION

The present invention relates generally to textile cords and more specifically to cords for reinforcing belts, overlays, bead portions and carcasses of tires. The invention discloses further a method for making such cords and a tire including such cords.

Reinforcement cords currently used in tires are composed of one or several yarns consisting of fibers of textile material such as nylon, polyester and rayon, such reinforcement having a linear yarn density of 1,000 to 9,000 Denier. The yarns and the cord are respectively twisted from about 6 TPI to about 12 TPI. Such multifilament cords are cheap to manufacture and easy to treat. The drawbacks of these cords are that they are soft, have a low tenacity and historically were developed to optimize carcass fatigue resistance in bias ply tires.

It is also known in the tire art to use polyamide monofilaments, such as HYTEN®, or monofilaments of polyester, to reinforce tire components, such as chafers and chippers. The monofilament cords may have exceptional tenacity, providing strength levels which cannot be attained in comparable twisted cords. Unfortunately these cords are expensive and can lead to tire building problems due to their high stiffness. Furthermore they offer a reduced surface for bonding to rubber.

SUMMARY OF THE INVENTION

The invention provides a textile cord, a tire including these cords and a method adapted for making such cords. A pneumatic tire reinforced with cords of textile material comprises a carcass including at least one radial carcass ply, a tread disposed radially outwardly of the crown region of the carcass, and a crown reinforcing structure interposed between the tread and the crown region of the carcass in circumferential surrounding relation to the carcass. The crown reinforcing structure of the tire includes a belt assembly having at least a first, radially innermost and a second, radially outermost belt ply, each of the belt plies comprising reinforcement cords extending parallel to one another in each belt ply, and an optional overlay structure having a width substantially equivalent to the tread width, wherein at least one of the cords of textile material includes at least one multifilament yarn, wherein the at least one of the cords of textile material has a first portion adjacent to its outer peripheral surface and a second, radially innermost portion, wherein the filaments in the second, radially innermost portion are compacted or fused together and the filaments in the first portion are discrete filaments.

In an illustrated embodiment, the tire comprises at least three belt plies and an overlay structure which comprises reinforcement cords, the overlay reinforcement cords forming an angle with the equatorial plane of 0° to 45°. The illustrated tire has at least one cord of textile material which is constructed by twisting together three nylon 66 1890 Denier yarns at three turns per inch (3 TPI), and wherein in a cross section of the cord, the area of the second, radially innermost portion is 50% to 99% of the area of the cord cross section.

Prior art textile multifilament tire cords are processed at temperatures lying between 15 and 30 degrees Celsius below the melting point of the fibers constituting the cord, so as to generate flexible cords. According to the invention the temperature is chosen so as to fuse portions of the filaments together to generate a stiff cord, with high compaction such that the cord shows some properties similar to those of a monofilament and others similar to those of conventional multifilament cords. A standard unit used for treating textile cords or rolls of textile fabric material requires only minor modifications of its processing parameters in order to implement the invention.

BRIEF DESCRIPTION OF THE DRAWINGS

Certain preferred embodiments of the invention are now described with reference to the annexed drawings. These embodiments are directed towards the use of nylon cords, as herebelow defined, and they are only illustrative and can be modified in numerous ways within the scope of the invention defined in the claims herebelow.

DEFINITIONS

As used herein and in the claims, the "equatorial plane" of the tire is a plane that is perpendicular to the axis of rotation of the tire and passes through the center of the tire tread, the terms "axial" and "axially" refer to directions which are parallel to the axis of rotation of the tire and the terms "radial" and "radially" refer to directions that are radially toward or away from the axis of rotation of the tire. "Denier" is understood to mean the weight in grams of 9,000 meters of a yarn before the yarn has a twist imparted thereto.

DETAILED DESCRIPTION OF THE INVENTION

Figure 1:
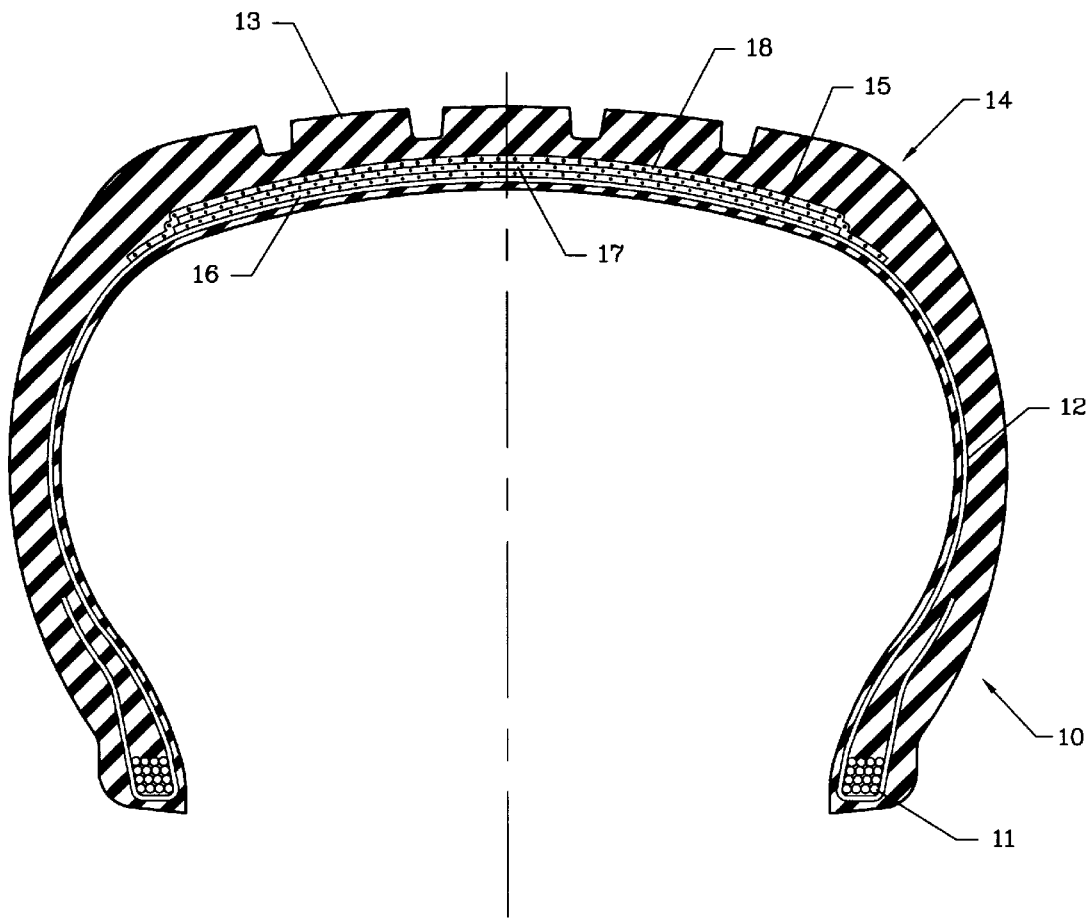
FIGS. 1 and 1a are cross-sectional views of alternative embodiments of pneumatic tires made in accordance with the present invention.

With reference to FIG. 1, there is represented a portion of a radial carcass pneumatic tire 10 having a pair of substantially inextensible bead cores 11 which are axially spaced apart with at least one radial carcass ply 12 extending between the bead cores 11. The carcass plies are folded axially and radially outwardly about each of the bead cores and are reinforced by cords which are substantially parallel to each other and make an angle comprised between 70° and 90° with the equatorial plane (EP) of the tire.

The crown area 14 of the tire 10 is reinforced by a belt assembly 15 located radially inwardly of the tire tread 13.

A passenger tire has usually two belt plies and the cords of the radially innermost belt ply 16 may make an angle of 15° to 30° with the equatorial plane (EP) of the cured tire, whereas the cords of the radially outermost belt ply 17 will make an angle of −15° to −30° with the equatorial plane (EP) of the cured tire; preferred cord angles are respectively 17° to 23° and −17° to −23°. The cords of the plies reinforcing the tire can be made of any suitable material, for example steel, rayon, polyester, polyamide or aromatic polyamide.

The tire may further have an optional overlay structure reinforcing and protecting the radially outermost belt ply 17. Such overlay structure may consist of a ply 18 having a width substantially equivalent to the tread width. The cords reinforcing the ply may form an angle with the equatorial plane, of 0° to 30°. Alternatively the overlay structure may consist of a ribbon, having a width of 5 to 30 mm, wound helically on the radially outer belt ply. Details about such a tire crown reinforcement may be found in LU 85.964.

It lies within the scope of the present invention to replace any of the textile cords used for reinforcing portions of a passenger tire with the quasi-monofilament described herein.

Figure 1A:
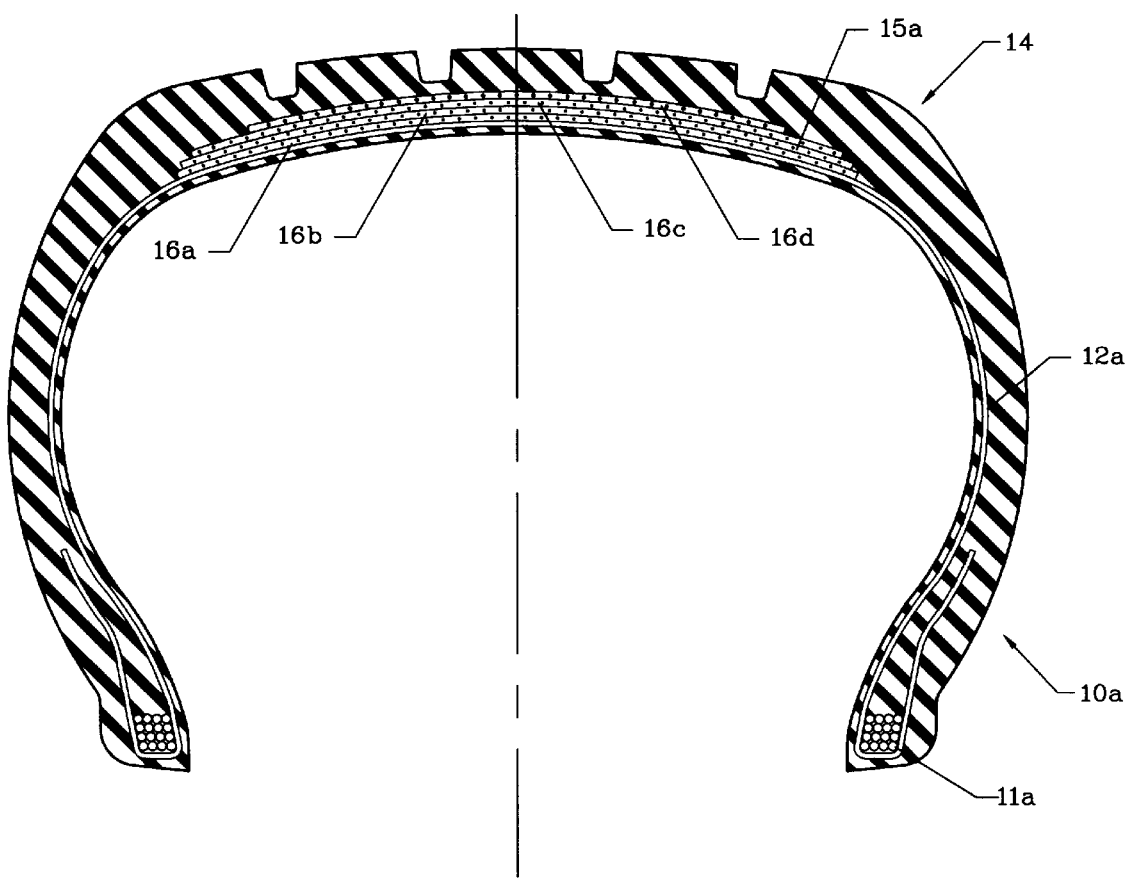

A preferred application of the cords of the invention is to reinforce the radially outer belt ply 16d of a truck tire. Such a tire 10a, having a pair of substantially inextensible bead cores 11a which are axially spaced apart with at least one radial carcass ply 12a extending between the bead cores, is shown in FIG. 1a. The belt assembly 15a is essentially rigid and comprises usually four concentric belt plies 16a, 16b, 16c, 16d. The reinforcement members in the belt plies have usually an angle comprised between 5° and 35° with respect to the equatorial plane of the tire. The reinforcement members of the second and third belt, 16b and 16c are crossed, whereas the reinforcement members of the top belt ply 16d may have the same direction as those of the third belt, with respect to the equatorial plane.

Figure 2:
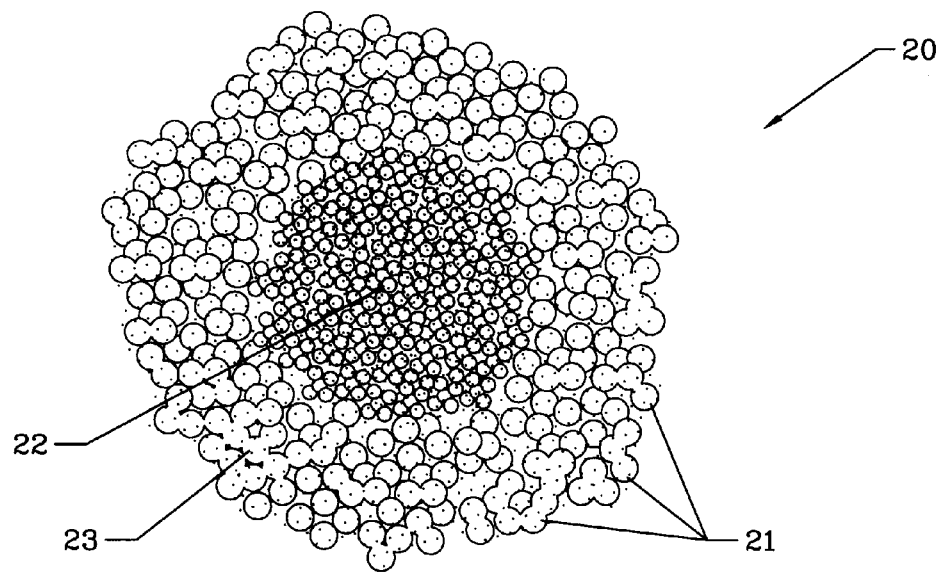
FIGS. 2 and 2a represent a respectively 80 and 400 times magnified cross section of a cord including one yarn treated according to the present invention.
Figure 2A:
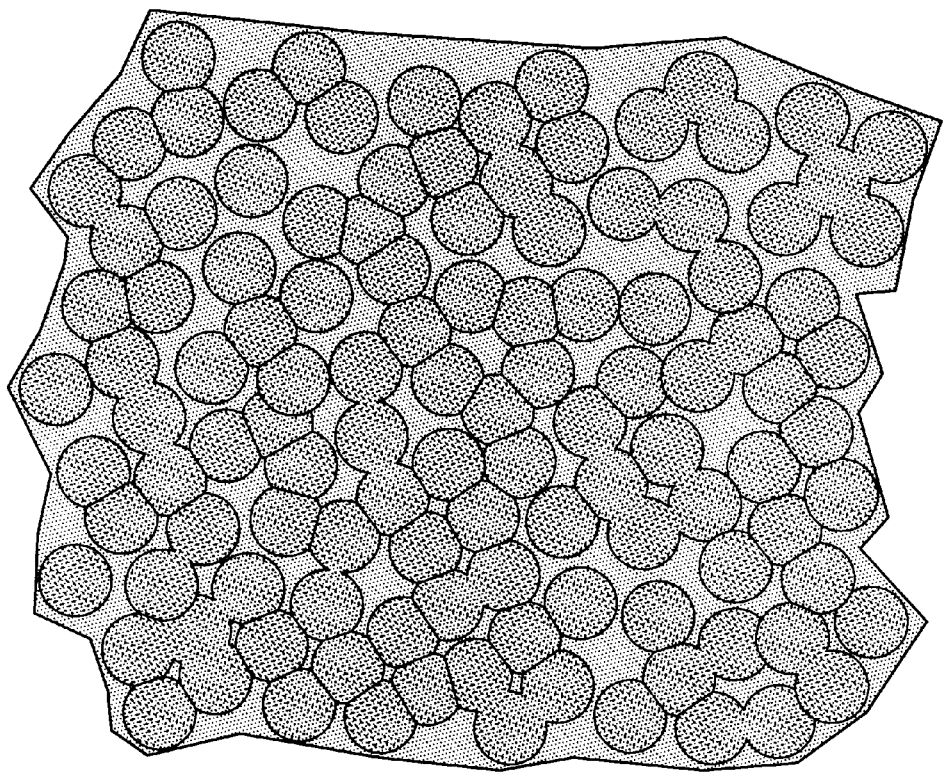

Referring now to FIG. 2, there is shown an 80 times enlarged cross-section of a quasi-monofilament cord 20 according to the invention comprising one yarn, having a linear density of ABOUT 6,000 Denier after twisting at 3 TPI. Such a yarn can e.g. be obtained by assembling three yarns of 1890 Denier. The yarn comprises a plurality of nylon filaments 21. The filaments near the center 22 of the cord are compacted and possibly fused together whereas towards the periphery 23 of the cord the filaments have kept their individuality. FIG. 2a represents a 400 times magnified cross section of a portion of the cord 20 near the center 22. Compacted filaments take on a polygonal shape caused by contact with adjacent filaments while in a softened state.

Figure 3:
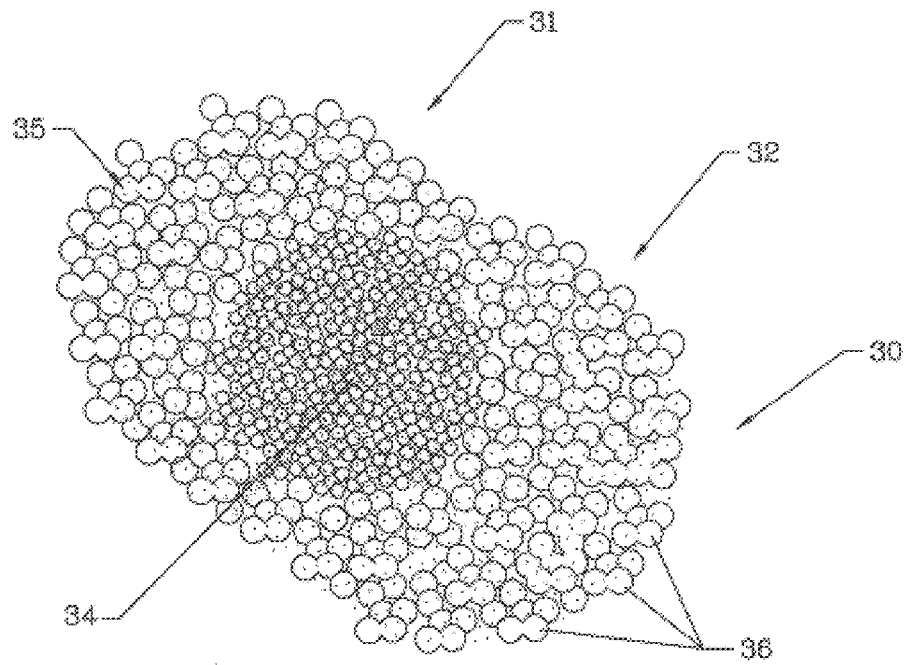
FIGS. 3 and 3a show a respectively 80 and 400 times magnified cross section of a cord including two yarns treated according to the present invention.

Referring now to FIG. 3, there is shown an 80 times enlarged cross-section of a further quasi-monofilament cord according to the invention comprising two yarns 31, 32 having each a linear density of 1890 Denier and being twisted at 8 TPI (turns per inch); each of the yarns comprises a plurality of nylon filaments 36. As was the case with the single yarn in FIG. 2, filaments at the periphery 35 maintain their individuality and filaments near the center 34 are compacted and possibly fused.

The cord is obtained by twisting the yarns at 8 TPI at a hand opposite to the one of the cords. The direction of twist refers to the direction of slope of the spirals of a yarn or cord when it is held vertically. If the slope of the spirals conform in direction to the slope of the letter "S", then the twist is called "S"or "left hand". If the slope of the spirals conform in direction to the slope of the letter "Z", then the twist is called "Z" or "right hand". An "S" or "left hand" twist direction is understood to be an opposite direction from a "Z" or "right hand" twist. "Yarn twist" is understood to mean the twist imparted to a yarn before the yarn is incorporated into a cord, and "cord twist" is understood to mean the twist imparted to two or more yarns when they are twisted together with one another to form a cord.

Figure 3A:
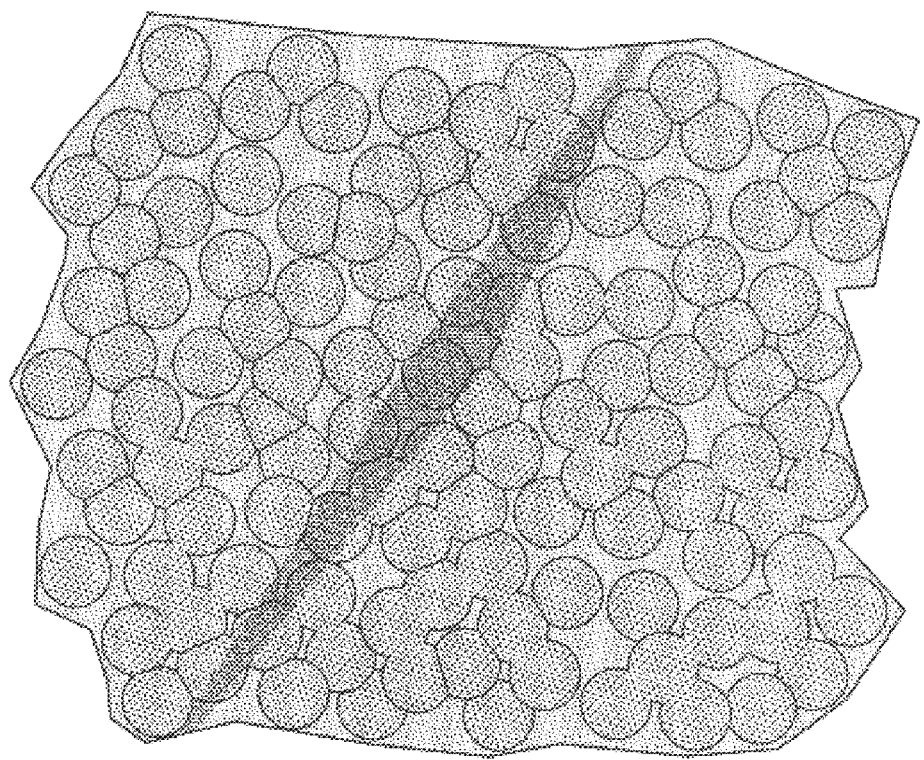

FIG. 3a represents a 400 times magnified cross section of a portion of the cord 30 near the center 34.

Figure 4:
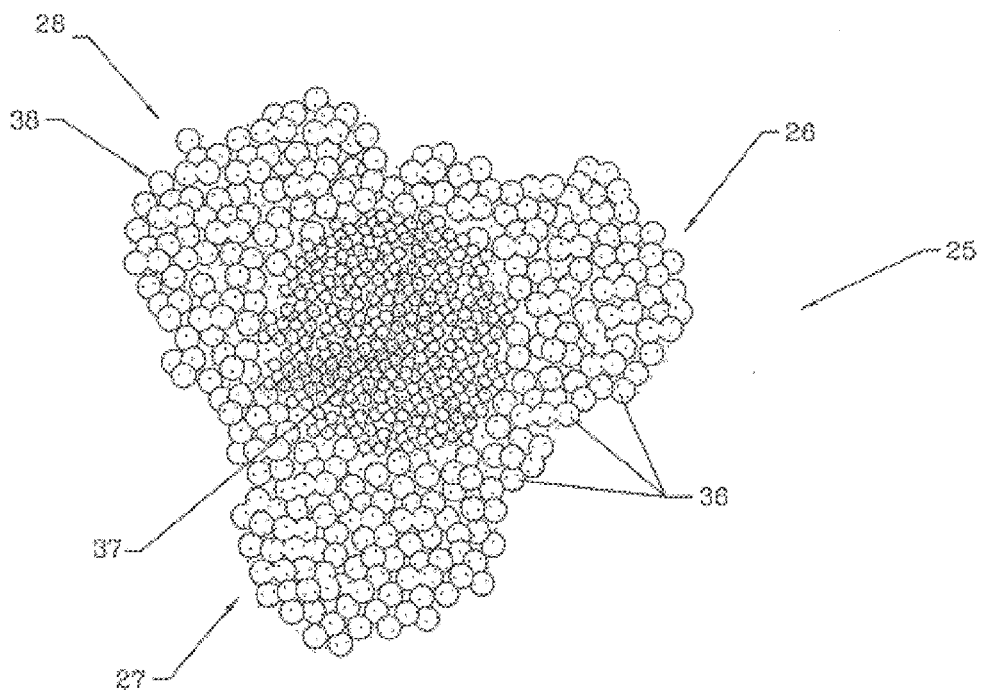
FIGS. 4 and 4a how respectively 80 and 400 times magnified cross section of a cord including three yarns treated according to the present invention.

Referring now to FIG. 4, there is shown an 80 times enlarged cross-section of a further quasi-monofilament cord 25 according to the invention comprising three yarns 26,27, 28 having each a linear density of 1890 Denier and being twisted at 3 TPI; each of the yarns comprises a plurality of nylon filaments 36. As was the case with the single yarn in FIG. 2 or 3, filaments at the periphery 38 maintain their individuality and filaments near the center 37 are compacted and possibly fused.

The cord 25 is obtained by twisting the three yarns at 3 TPI at a hand opposite to the one of the cords.

Figure 4A:
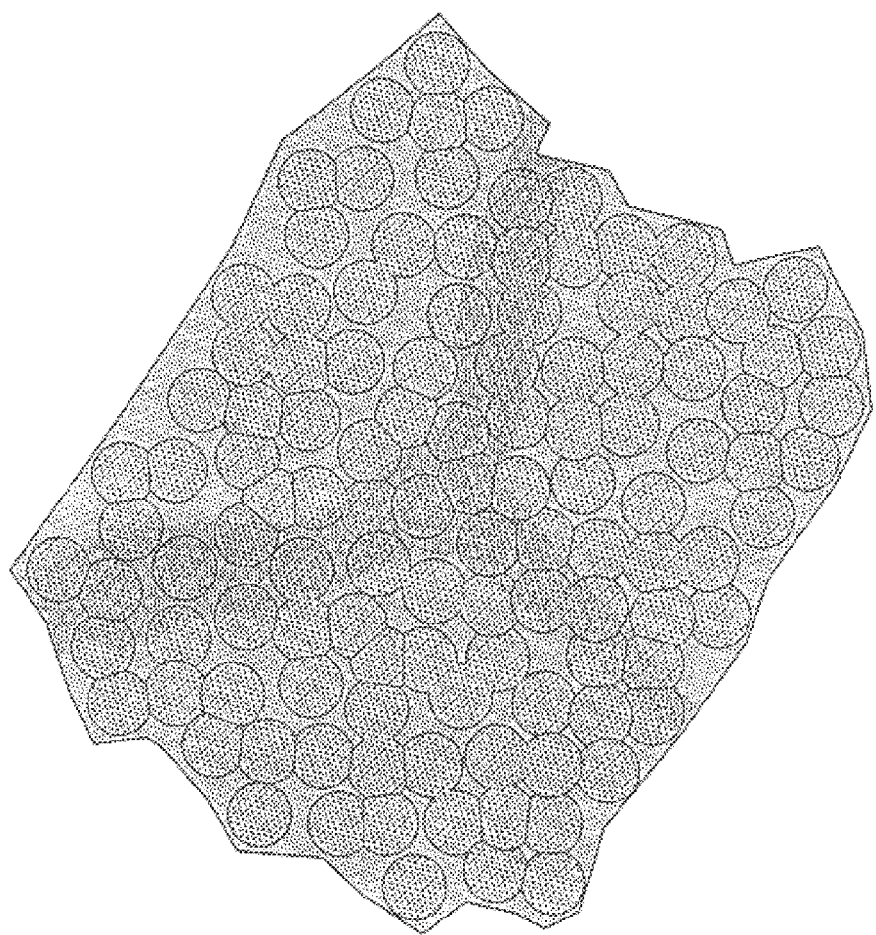

FIG. 4a represents a 400 times magnified cross section of a portion of the cord 25 near the center 37.

Figure 5:
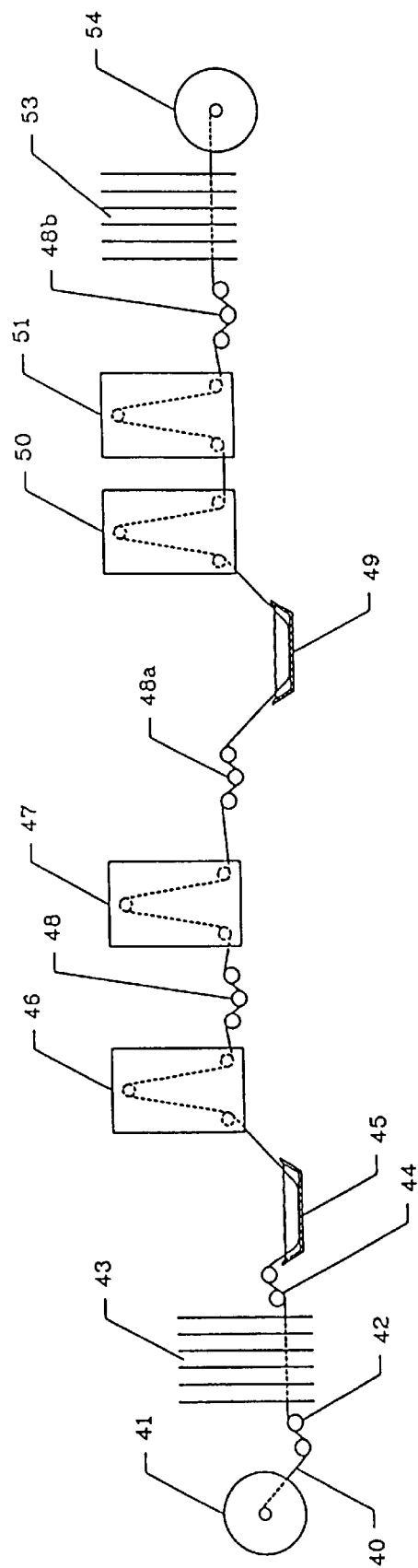
FIG. 5 is a schematic plan view of an apparatus which can be used in the method of making cords according to the invention.

FIG. 5 shows a schematic plan view of equipment which can be used for implementing the invention. The equipment includes a pay-off 41 for unwinding a roll of greige textile material 40—which material is nylon 66 in this example a number of guiding rolls 42, a festoon 43 followed by a set of pull rolls 44. From the pull rolls 44, the textile material 40 enters a dipping unit 45 and thereafter a drying tower 46. The dipping unit 45 contains a coating solution, which for nylon may be RFL (resorcinol formaldehyde latex). Such solutions are e.g. described in the book "Mechanics of Pneumatic Tires", U.S. department of transportation, U.S. Government Printing Office, 1982; pp. 92–93. The textile material migrates through the drying tower in about 60 seconds and is exposed, in a controlled atmosphere containing hot airs to a temperature of 140° C. plus or minus 20° C.

From the drying tower 46, the cords enter a high temperature oven 47 wherein the temperature is set at 270° C. plus or minus 10° C. This temperature must be chosen high enough to cause melting of some of the textile material constituting the filaments—nylon 66 starts melting at about 250° C.—but not so high as to degrade the textile material. The heating up of the cords is immediate and almost uniform, because of the cords' low thermal capacity. The tension applied to the cords is higher in the center of the cord than at its periphery. The skin of the individual filaments soften and compress, and may fuse together with neighboring filaments under the combined action of heat and tension. Depending on the temperature in oven 47 and the staying time of the textile material in the high heat region, there is more or less melting of the filaments constituting the nylon cords, or put in other words, the amount of fusion and compaction can be controlled by exposure time, temperature level and applied tension. Staying times for nylon 66 cords having a diameter of 0.60 to 0.80 mm, at the indicated temperature, is between 30 and 120 seconds, 60 seconds being preferred.

The high temperature oven 47 is followed by a set of pull rolls 48, a second dipping unit 49, a second drying unit 50 and a second high temperature oven 51. The dipping unit 49 contains an RFL solution The textile material crosses the drying tower 50 in 90 to 120 seconds and is exposed, in a controlled atmosphere containing hot air, to a temperature of 140° C. plus or minus 20° C. The second high temperature oven 51 operates at a slightly lower temperature than the first high temperature oven 47, preferably between 180° C. and 245° C. This temperature permits the adhesive to react with the textile material. The high temperature oven 51 is followed by a set of pull rolls 52, a festoon 53 and a wind-up unit 54.

The textile material comprises warp cords and weft cords. It may be of advantage to choose the weft cords so as not to be degraded at the melting temperature of the warp cords. In this case the weft cords retain their original dimensional properties.

As the ply 40 is pulled lengthwise from the pay-off 41, through the festoons 43, 53, the dipping units 45, 49, the drying towers 46, 50 and the high temperature ovens 47, 51 there is a risk that a substantial tension force might be applied on the warp cords during some of the method steps. This tension force must be in a specific range in order to generate the required cord compaction without harming the cord fatigue resistance. The described equipment, preferred for implementing the invention, comprises three pull roll sets 44, 48 and 52. A careful control of the power applied to the pull roll sets allows a precise tuning of the tension applied to the textile material during the different treatment steps.

Figure 6:
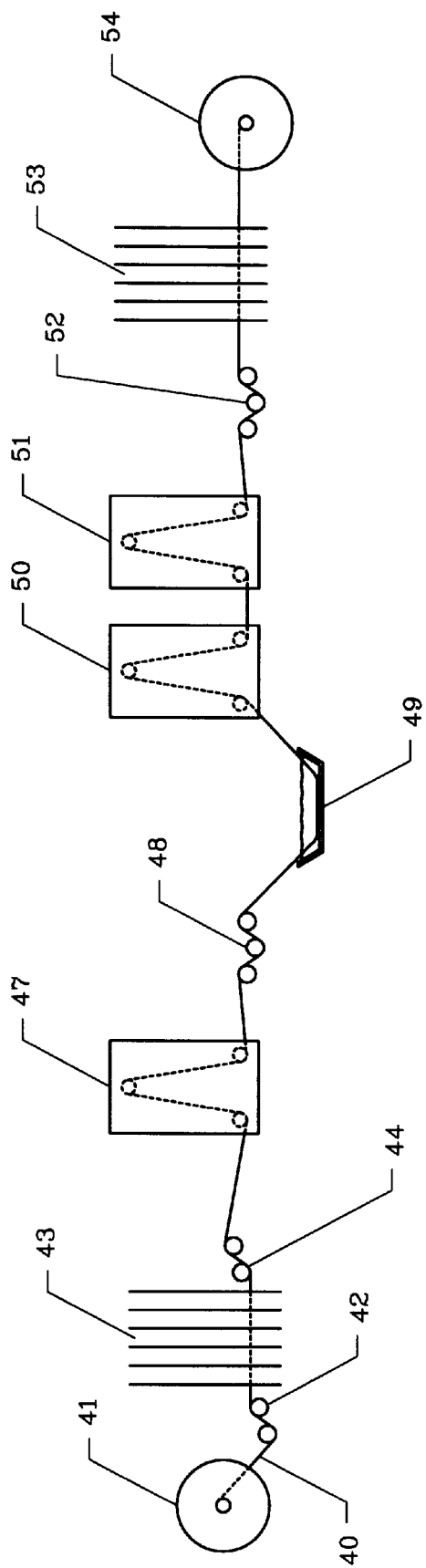
FIG. 6 is a schematic plan view of another apparatus which can be used in the method of making cords according to the invention.

According to an alternative embodiment of the invention illustrated in FIG. 6, the textile material 40 enters the high temperature oven 47 directly, without passing through the dipping unit 45 and the subsequent drying tower 46. The textile material has its core portions compacted and possibly fused before it enters the dipping unit 49. Following the dip, the drying unit 50 and the second high temperature oven 51 fix the adhesive to the cord. The high temperature oven 51 is followed by a set of pull rolls 52, a festoon 53 and a wind-up unit 54. The temperatures, different staying times, tensions applied to the textile material etc. are similar to those described above.

Table 1 list results obtained with nylon cords treated by the method steps according to the first of the two above described embodiments of the invention.

The multifilament cords are 1890/3/1 denier nylon cords, which have been twisted at 3 TPI. The different cord samples 961 etc., referred to as LDS and listed in Table 1 are from two manufacturers; the last column shows the properties of a Nylon monofilament cord having the same Denier. Apart from the temperature of the oven and the staying time therein, the tensile strength fatigue testing data of the cord before treatment according to the invention and after 8 hours flexing are listed. Diffusion means gas diffusion through the cord section over a 3 cm long cord embedded in rubber. Stiffness has been rated between 1 and 10, 1 being soft and 10 very stiff.

ation. However, tensile strength diminishes whereas fatigue resistance drops sharply at excessive exposure time.

The invention can be used in cords having only five hundred Denier as well as with giant cords of more than six thousand Denier. The textile material may be nylon, polyester, PET, PEN, polyvinylalcohol and mixes of such. It is further possible to combine non-melting material, such as aramid, with melting material, such as polyamide or polyester; the non-melting and the melting material are preferably in different yarns constituting the cord. Through routine experimentation, the person skilled in the art may determine the appropriate temperature and exposure time to optimize the properties of a cord to the requirements of a given application.

While certain representative embodiments and details have been set forth for the purpose of illustrating the invention, it will be apparent to those skilled in the art that various changes and modifications may be made therein without departing from the scope of the invention as defined in the appended claims.

What is claimed is:

1. A pneumatic tire reinforced with cords of textile material comprising a carcass including at least one radial carcass ply, a tread disposed radially outwardly of the crown region of the carcass and a crown reinforcing structure interposed between the tread and the crown region of the carcass in circumferential surrounding relation to the carcass, whereby the crown reinforcing structure includes a belt assembly having at least a first, radially innermost and a second, radially outermost belt ply, each of the belt plies comprising reinforcement cords extending parallel to one another in each belt ply, and an optional overlay structure having a width substantially equivalent to the tread width, wherein at least one of said cords of textile material includes at least one multifilament yarn wherein said at least one of said cords of textile material has a first portion adjacent to its outer peripheral surface and a second, radially innermost portion, wherein the filaments in the second, radially innermost portion are compacted or fused together and the filaments in the first portion are discrete filaments.

2. The tire of claim 1, comprising at least three of said belt plies and said overlay structure which comprises reinforcement cords, said overlay reinforcement cords forming an angle with the equatorial plane of 0° to 45°.

3. The tire of claim 2, wherein said at least one of said cords of textile material are constructed by twisting together

| LDS | 961-1 | 961-2 | 961-3 | 978-A | 979-A | 980-A | 988-A | 989-A | 990-A | Monofil |
|---|---|---|---|---|---|---|---|---|---|---|
| Oven Temp. (° C.) | 140 | 270 | 275 | 270 | 270 | 270 | 265 | 265 | 265 | 140 |
| Exp. Time (sec.) | 60 | 60 | 60 | 60 | 80 | 100 | 60 | 80 | 100 | 60 |
| Tensile (N) | 535 | 498 | 466 | 458 | 420 | 334 | 494 | 485 | 476 | 352 |
| Fatigue Original (N) | 537 | 499 | 453 | 464 | 400 | 328 | 495 | 492 | 477 | 345 |
| Fatigue, treated 8 h. flex. (N) | 374 | 350 | 321 | 325 | 226 | 45 | 344 | 360 | 334 | 301 |
| Retained (%) | 70 | 70 | 71 | 70 | 57 | 14 | 69 | 73 | 70 | 87 |
| Diffusion | YES | YES | YES | YES | SOME | NO | YES | YES | YES | NO |
| Stiffness (N) | 1 | 3 | 4 | 4 | 6 | 8 | 3 | 5 | 7 | 10 |

It appears that the quasi-monofilament cords according to the invention have the potential to replace monofilaments. Increasing the fusion temperature or the exposure time increases the number of compacted and possibly fused core filaments, increases the stiffness and decreases gas permethree nylon 66 1890 Denier yarns at three turns per inch (3 TPI) and wherein in a cross section of the cord, the area of the second, radially innermost portion is 50% to 99% of the area of the cord cross section.

* * * * *